July 20, 1943.　　　J. B. WHITTED　　　2,324,894
WINDSHIELD WIPER
Filed March 9, 1942
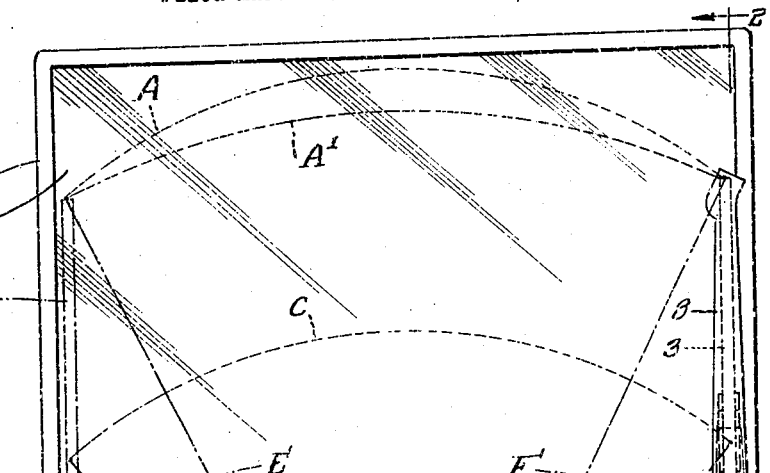
INVENTOR.
John B. Whitted

Patented July 20, 1943

2,324,894

UNITED STATES PATENT OFFICE 2,324,894

WINDSHIELD WIPER

John B. Whitted, Evanston, Ill., assignor to Stewart-Warner Corporation, Chicago, Ill., a corporation of Virginia Application March 9, 1942, Serial No. 433,939

10 Claims. (Cl. 15—253)

This invention relates to windshield wipers and one object of the invention is to provide a new and improved device of that character.

Another object is to provide a windshield wiper operated from a single fulcrum axis and arranged to clean a maximum portion of the total area of the windshield.

A further object of the invention is to provide a windshield wiper which includes a wiper blade mounted to oscillate in an arcuate path over a windshield surface, together with means maintaining the blade in a position substantially parallel to its initial position throughout its range of movement.

It is also an object of the invention to provide a windshield wiper which includes a wiper blade and a plurality of actuating arms therefor connected to the blade at points spaced apart in the length thereof, but fulcrumed to swing about a common axis with driving means to swing said arms simultaneously through different angles so proportioned as to maintain the blade substantially parallel to its initial position.

More specifically, the invention undertakes to provide driving means for a windshield wiper blade which includes a pair of coaxial rock shafts with actuating arms respectively attached to the blade at separated points in the length thereof, and with separate rocker arms connected for oscillation by a common driving crank, the rocker arms being of different lengths, so proportioned as to give the actuating arms different angular strokes for maintaining the blade substantially parallel to its initial position throughout its movement.

Other objects and advantages will appear from the following description taken in connection with the drawing, in which:

Fig. 1 is a front elevation showing a windshield with a windshield wiper embodying this invention mounted in operative relation thereto.

Fig. 2 is a vertical sectional view taken substantially as indicated at line 2—2 on Fig. 1.

Fig. 3 is a fragmentary detail view in perspective showing a compensating link connected between the wiper blade and an actuating arm.

The windshield shown in the drawing as comprising a frame 1 and a glass pane 2 secured therein is of approximately square form, but it may be understood that the invention is not limited to use over an area of these particular proportions. The wiping element 3 may consist of the usual rubber squeegee 3ª secured in a channel shaped holder 3ᵇ, and this assembly will be referred to generally as the "wiper blade." In its initial position, as shown in Fig. 1, the blade 3 extends in a substantially vertical plane adjacent one side of the frame 1 and, in order that it may operate over a maximum area of the windshield glass 2, it is desirable to maintain the blade in parallel relation to its initial position throughout its range of movement across the windshield. To avoid the use of guides or other supports attached to the windshield itself, it is preferable to operate the wiper blade 3 from a single fulcrum axis which, of course, causes it to travel in an arcuate path, and this path is defined by the arcs shown in dotted lines at A and B on Fig. 1. The axis of oscillation which causes the blade 3 to sweep the area between the arcs A and B is the axis of the drive shaft 4 and its tubular companion shaft 5, said shafts being coaxially journaled in a bushing 6 extending through the portion 7 of the vehicle body wall just below the windshield. The shaft 4 carries an actuating arm 8 and the shaft 5 carries an actuating arm 9, and the mechanism about to be described is arranged to oscillate these arms through different angles so proportioned as to maintain the wiper blade 3 in positions parallel to its initial position throughout the range of movement.

The arm 9 is shown attached to the blade 3 substantially at the middle of the length of the blade by a pivotal connection at 10, and the arm 8 is connected near the upper end of the blade by a link 11 which includes a swivel connection provided by a block 12 which is carried by a pivot 13 in the upper end of the arm 8. The arm 9 is formed with hinged joint at 14 having a spring 15 arranged to urge the outer end of the arm 9 yieldingly toward the surface of the windshield for pressing the squeegee 3ª against it to secure a proper wiping action. The arm 8 is hinged at 16 to permit it to follow the blade 3 as it traverses the windshield surface and to insure that the blade shall maintain contact with said surface without interference by reason of its connection to the arm 8.

The outer end of the drive shaft 4 is threaded, and an adjacent portion is tapered and splined for interlocking engagement with a block 8ª secured in the lower end of the arm 8. A nut 8ᵇ on the threaded end of the shaft serves to maintain this engagement. Similarly, the outer end of the hollow shaft 5 is threaded, and its adjacent portion is tapered and splined to interlock with a block 9ª secured in the lower end of the actuating arm 9 and maintained in this relation by a nut 9ᵇ on the threaded portion of the shaft 5. At its opposite end, the shaft 4 is provided with a rigidly extending driving arm 18 and the shaft 5 is similarly provided with a driving arm 19.

For operating the windshield wiper, the drawing shows an electric motor 20 with a casing 21 secured adjacent the motor, and it may be understood that said casing encloses any suitable form of speed reducing gearing, such as a worm and worm wheel arranged to drive a relatively slow speed shaft 22 journaled in the casing 21, and extending through it at one side. The shaft 22 carries a crank arm 23 with a crank pin 24 from which the driving links 28 and 29 extend respectively into pivotal connection with the driving arms 18 and 19. Thus, the continuous rotation of the shaft 22 and its crank 23 results in oscillatory movement of the arms 18 and 19 which is transmitted by the shafts 4 and 5 to the actuating arms 8 and 9 which carry the wiper blade 3. The pivotal connection at the outer end of the arm 9 is thus caused to sweep through the arc indicated at C on Fig. 1, while the swivel link 11 at the outer end of the arm 8 is propelled along a path approximately coinciding with the arc A on Fig. 1.

The angular range of movement of the arm 8 about the axis of its shaft 4 is bounded in Fig. 1 by the dotted lines E and F, while the angular range of movement of the arm 9 is defined by the lines G and H. In order that the common driving member, which is the crank pin 24, shall simultaneously produce these differing degrees of movement in the arms 8 and 9, the driving arms 18 and 19 are made of different lengths as shown in the drawing, the arm 18, which actuates the shaft 4 and the arm 8, being the longer. Thus, as the shaft of the motor 20 rotates continuously in one direction and causes continuous rotation of the shaft 22 and crank pin 24, this rotary movement of the crank pin is transformed into oscillatory movement of the arms 18 and 19, and these movements are so proportioned as to cause the arms 8 and 9 to sweep their connections with the blade 3 simultaneously through different angular ranges, but so that two points of connection shall travel substantially similar paths and thus maintain the blade in the desired vertical position throughout its range of movement. Both arms 8 and 9 are bent at 30 so that, in the initial position of the wiper blade 3 at one side of the frame 1, the portions of the arms 8 and 9 which overlie the windshield shall coincide substantially with the blade assembly 3, so as to form a minimum obstruction of the windshield area when the wiper is idle. But the bent arm 8 functions as a lever arm with the center line F, and the bent arm 9 functions as a lever having a center line H. Thus the actual sweep of the outer end of the arm 8 may be represented by the arc $A^1$ struck about the axis of the shaft 4, and this arc does not coincide perfectly with the arc A, which represents the path of travel of the outer end portion of the blade 3. For this reason, the compensating link 11 is employed to connect the outer end of the arm 8 with the upper end of the blade 3, being attached to the arm 8 by the pivot 13 and having its opposite end bifurcated and removably secured to the blade 3 by a cotter pin 31. The pivot 13 engages the head portion 12 of the link and the swivel connection between said head 12 and the shank of the link 11 provides the necessary pivotal action between the arm 8 and the blade 3 as the arm changes its angular relation to the blade during its working stroke. The pivot 10 at the end of the arm 9 is also bifurcated and removably connected to a lug $3^c$ of the blade 3 by means of a cotter pin 32.

Thus the arm 9, connected to the middle of the blade 3, may be considered as serving normally as the actuating member, while the arm 8, connected to the upper end of the blade, may act ordinarily as a control member to maintain the blade parallel to its initial position at all times; but it may be noted that the arm 8, with its link 11, and its positive connection to the crank pin 24, is also capable of assuming a part of the operating load, and will do so when the resistance to movement is unevenly distributed along the wiper blade. Therefore, this arrangement is superior to, and more reliable than, any system of mere guides for maintaining the desired position of the blade throughout its range of movement.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim as my invention:

1. In a windshield wiper, in combination with a wiper blade, a pair of actuating arms therefor connected to the blade at points spaced apart in the length thereof, said arms being fulcrumed to swing about a common axis, and driving means with transmitting mechanism therefrom actuating said arms simultaneously through different angles proportioned to maintain the blade substantially parallel to its initial position throughout the range of movement.

2. In the combination defined in claim 1, the connection of one of the arms to the blade being a simple pivotal connection, and the connection of the other arm to the blade being a link which includes a swivel portion providing pivotal action for the angular movement of the arm with relation to the blade.

3. In the combination defined in claim 1, one of the arms being connected to the blade at substantially the middle of its length by a simple pivot having its axis substantially parallel to the fulcrum axis, and the other arm being connected to the blade near one end thereof by a link pivoted at one end to the blade and at its other end to the arm, said end portions of the link being swivelly connected to each other for relative movement about an axis approximately parallel to the said fulcrum axis.

4. In a windshield wiper, a wiper blade, actuating means mounted to swing about a fixed fulcrum axis, a pivotal connection between said means and the blade, and control means engaging the blade at a point spaced from said pivotal connection on the longitudinal axis of the blade and acting to maintain said point in an arc equal in radius and in length to the arc traversed by said pivotal connection, thereby holding the blade substantially parallel to its initial position throughout its range of movement.

5. In combination with the structure defined in claim 4, a common driving member and separate operating connections therefrom to said actuating means and to said control means respectively for moving them simultaneously.

6. In a windshield wiper, a wiper blade and two actuating means therefor swinging about a common axis connected at two spaced points on the longitudinal axis of said blade, said means moving said points of the blade through arcs of equal length and equal radius, together with driving means and connections therefrom proportioned to oscillate said actuating means simultaneously at different rates.

7. In a windshield wiper, in combination with a wiper blade, a pair of actuating arms therefor connected to the blade at points spaced apart in the length thereof, said arms being fulcrumed to swing about a common axis, driving arms connected rigidly to said actuating arms respectively and extending from the common fulcrum axis, a common driving member traveling in a plane transverse to said axis, and motion-transmitting means connecting said driving member to the driving arms at different distances respectively from the fulcrum axis proportioned to cause different angular movements of the actuating arms simultaneously in response to the travel of said driving member and of such relative extent as to maintain the blade substantially parallel to its initial position throughout the range of movement.

8. In a windshield wiper, in combination with a wiper blade, a pair of actuating arms therefor connected to the blade at points spaced apart in the length thereof, said arms being fulcrumed to swing about a common axis, driving arms connected rigidly to said actuating arms respectively and extending from the common fulcrum axis, a common driving pin mounted for travel in a plane transverse to said axis, and links connecting said pin to the driving arms at different distances respectively from the fulcrum axis proportioned to cause different angular movements of the actuating arms simultaneously in response to the motion of the driving pin and of such relative extent as to maintain the blade substantially parallel to its initial position throughout the range of movement.

9. In a windshield wiper, in combination with a wiper blade, a pair of actuating arms therefor connected to the blade at points spaced apart in the length thereof, said arms being fulcrumed to swing about a common axis, driving arms connected rigidly to said actuating arms respectively and extending from the common fulcrum axis, a rotary driving member with a crank pin mounted for rotation in a plane transverse to said axis, and links connecting said pin to the driving arms at different distances respectively from the fulcrum axis proportioned to cause different angular movements of the actuating arms simultaneously in response to the rotation of said driving member and of such relative extent as to maintain the blade substantially parallel to its initial position throughout the range of movement.

10. In a windshield wiper, in combination, a wiper blade, a pair of actuating arms therefor connected to the blade at points spaced apart in the length thereof, a pair of coaxial rock shafts to which said arms are respectively secured, a driving arm on each shaft, a rotary driving member with a crank pin, and a pair of links connecting said crank pin with said driving arms respectively, said driving arms being of different length and being proportioned to cause simultaneous oscillation of the two actuating arms through different angles adapted to maintain the blade substantially parallel to its initial position throughout the range of oscillation.

JOHN B. WHITTED.